(12) United States Patent
Zhang

(10) Patent No.: US 12,364,921 B2
(45) Date of Patent: Jul. 22, 2025

(54) JOYSTICK DRIFT PROCESSING METHOD, DEVICE AND RELATED COMPONENTS

(71) Applicant: GOERTEK INC., Shandong (CN)

(72) Inventor: Zhen Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 344 days.

(21) Appl. No.: 17/997,227

(22) PCT Filed: Nov. 7, 2020

(86) PCT No.: PCT/CN2020/127344
§ 371 (c)(1),
(2) Date: Oct. 26, 2022

(87) PCT Pub. No.: WO2022/000919
PCT Pub. Date: Jan. 6, 2022

(65) Prior Publication Data
US 2023/0182007 A1    Jun. 15, 2023

(30) Foreign Application Priority Data

Jun. 30, 2020 (CN) .......................... 202010614511.8

(51) Int. Cl.
A63F 13/22 (2014.01)
A63F 13/218 (2014.01)
A63F 13/24 (2014.01)
A63F 13/42 (2014.01)

(52) U.S. Cl.
CPC ............ *A63F 13/24* (2014.09); *A63F 13/218* (2014.09); *A63F 13/22* (2014.09); *A63F 13/42* (2014.09); *A63F 2300/1018* (2013.01); *A63F 2300/1043* (2013.01)

(58) Field of Classification Search
None
See application file for complete search history.

(56) References Cited

U.S. PATENT DOCUMENTS

2005/0221569 A1  10/2005  Nakata
2009/0055033 A1   2/2009  Gansler et al.
(Continued)

FOREIGN PATENT DOCUMENTS

CN   101123184 A   2/2008
CN   101271845 A   9/2008
(Continued)

*Primary Examiner* — Damon J Pierce
(74) *Attorney, Agent, or Firm* — LKGlobal | Lorenz & Kopf, LLP

(57) ABSTRACT

A joystick drift processing method, comprising: acquiring a command output state of a joystick (S101); not responding to a movement command generated by the joystick when the command output state is a drift output state (S102); and responding to a movement command generated by the joystick to adjust a state of a target object when the command output state is a normal output state (S103). It can distinguish whether the movement command generated by the joystick is based on user's operation or based on joystick drift. When the joystick is in the drift output state, the processor does not respond to the movement command generated by the joystick, so as to avoid the misoperation on the target object and improve the user's game experience.

12 Claims, 1 Drawing Sheet

(56) References Cited

U.S. PATENT DOCUMENTS

2013/0100021 A1* 4/2013 Larsen .................. A63F 13/214
  345/161
2017/0248629 A1 8/2017 Hammer et al.
2019/0332194 A1 10/2019 Zhang et al.

FOREIGN PATENT DOCUMENTS

| CN | 101861554 A | 10/2010 |
| CN | 107132378 A | 9/2017 |
| CN | 107883953 A | 4/2018 |
| CN | 207748805 U | 8/2018 |
| CN | 109358745 A | 2/2019 |
| CN | 109391899 A | 2/2019 |
| CN | 110435813 A | 11/2019 |
| CN | 110473746 A | 11/2019 |
| CN | 111760270 A | 10/2020 |

\* cited by examiner

JOYSTICK DRIFT PROCESSING METHOD, DEVICE AND RELATED COMPONENTS

CROSS-REFERENCE TO RELATED APPLICATIONS

This Application is a U.S. National-Stage entry under 35 U.S.C. § 371 based on International Application No. PCT/CN2020/127344, filed Nov. 7, 2020 which was published under PCT Article 21(2) and which claims priority to Chinese Application No. 202010614511.8, filed Jun. 30, 2020, which are all hereby incorporated herein in their entirety by reference.

This application pertains to Chinese patent application No. 202010614511.8 filed with the China Patent Office on Jun. 30, 2020 and entitled "Joystick Drift Processing Method, Device and Related Components", the entire content of which are herein incorporated by reference.

TECHNICAL FIELD

The present disclosure relates to the field of handles, in particular to a joystick drift processing method, a device and related components.

BACKGROUND

There are usually one or two joysticks on the game handle, VR handle and other types of handle. The game player can control characters in the game by controlling the rotation of the joystick. However, after the joystick is frequently used for a period of time, foreign matters such as dust and sweat will enter the interior of the joystick, such that movement commands are outputted without touching the joystick, and control game characters or machines to make wrong actions, which affects the user's game experience.

Therefore, how to provide a solution to the above technical problems is a problem to be solved by those skilled in the art. In addition, other objects, desirable features and characteristics will become apparent from the subsequent summary and detailed description, and the appended claims, taken in conjunction with the accompanying drawings and this background.

SUMMARY

The object of the present disclosure is to provide a joystick drift processing method, device, handle and computer-readable storage medium, which can distinguish whether the movement command generated by the joystick is based on user's operation or based on joystick drift. When the joystick is in the drift output state, the processor does not respond to the movement command generated by the joystick, so as to avoid the misoperation on the target object and improve the user's game experience.

In order to solve the above technical problem, the present disclosure provides a joystick drift processing method, comprising:
  acquiring a command output state of a joystick;
  not responding to a movement command generated by the joystick when the command output state is a drift output state; and
  responding to a movement command generated by the joystick to adjust a state of a target object when the command output state is a normal output state.

Preferably, a process of acquiring the command output state of the joystick specifically comprises:
  acquiring a movement parameter of the joystick corresponding to a current acquisition cycle; and
  comparing the movement parameter with a target parameter, and determining that the command output state is the drift output state or the normal output state according to a comparison result.

Preferably, a process of acquiring the command output state of the joystick is specifically:
  acquiring the command output state of the joystick via a detection device that is disposed on an operating lever of the joystick.

Preferably, the movement parameter includes a position parameter and/or a pressure parameter.

Preferably, when the command output state is a drift output state, the joystick drift processing method further comprises:
  providing prompt information corresponding to the drift output state when the command output state is the drift output state.

Preferably, a process of responding to the movement command generated by the joystick to adjust the state of the target object specifically comprises:
  obtaining a current position parameter of the joystick by means of the movement command; and
  adjusting the state of the target object according to the current position parameter and an initial position parameter.

Preferably, the joystick drift processing method further comprises:
  judging whether the command output state of the joystick is the drift output state when receiving a calibration command; and
  if yes, calibrating the joystick in response to the calibration command.

Preferably, a process of judging whether the command output state of the joystick is the drift output state specifically comprises:
  acquiring a plurality of position parameters of the joystick within a preset time period;
  when the plurality of position parameters are the same, and a difference between the position parameters and initial position parameters is greater than a preset threshold, determining that the state of the joystick is the drift state.

To solve the above technical problem, the present disclosure also provides a joystick drift processing device, comprising:
  an acquisition module for acquiring a command output state of the joystick; and
  a driving module for, not responding to a movement command generated by the joystick when the command output state is a drift output state, and responding to a movement command generated by the joystick to adjust a state of a target object when the command output state is a normal output state.

To solve the above technical problem, the present disclosure also provides a handle, comprising:
  a handle body on which a joystick is provided;
  a memory for storing a computer program; and
  a processor for realizing steps of the joystick drift processing method as described in any one of the above items when executing the computer program.

In order to solve the above technical problems, the present disclosure also provides a computer-readable storage medium. The computer-readable storage medium has a computer program stored thereon, and when the computer program is executed by a processor, steps of the joystick drift processing method as described in any one of the above items are realized.

The present disclosure provides a joystick drift processing method. First, the command output state of the joystick is obtained. Based on the command output state of the joystick, it can distinguish whether the movement command generated by the joystick is based on user's operation or based on joystick drift. When the joystick is in the normal output state, that is, the movement command generated by the joystick is based on user's operation, the processor in the handle responds to the movement command generated by the joystick to adjust the state of the target object. When the joystick is in the drift output state, the processor does not respond to the movement command generated by the joystick, so as to avoid the misoperation on the target object or machine and improve the user's game experience. The present disclosure also provides a joystick drift processing device, a handle and a computer-readable storage medium, which have the same beneficial effect as the joystick drift processing method.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The core of the present disclosure is to provide a joystick drift processing method, device, handle and computer-readable storage medium, which can distinguish whether the movement command generated by the joystick is based on user's operation or based on joystick drift. When the joystick is in the drift output state, the processor does not respond to the movement command generated by the joystick, so as to avoid the misoperation on the target object and improve the user's game experience.

In order to make the object, technical solutions and advantages of the embodiments of the present disclosure clearer, the technical solution in the embodiments of the present disclosure will be described clearly and completely below in conjunction with the accompanying drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

To facilitate understanding the solutions of the present disclosure, the handle to which the joystick drift processing method according to the present disclosure is applicable is introduced first. The handle comprises a joystick and a processor. The joystick generates a corresponding movement command according to the current position parameter of the joystick. The movement command here corresponds to the current position parameter of the joystick. The processor may acquire the movement command of the joystick once according to a first preset acquisition cycle. Alternatively, it may acquire the movement command of the joystick after receiving the change of the detection signal of the detection device or when the change value of the detection signal is greater than a preset threshold. The trigger condition for acquiring the movement command of the joystick is not limited in the present disclosure. The processor adjusts the state of the target object according to the movement command currently obtained. The target object here may be a virtual character or machine, and the state may include the parameters of the machine, viewing angles and/or actions of the virtual character, etc.

The joystick drift processing method according to the present disclosure will be described in detail below. The joystick drift processing method according to the present disclosure can be specifically realized by the processor in the handle.

Figure 1:
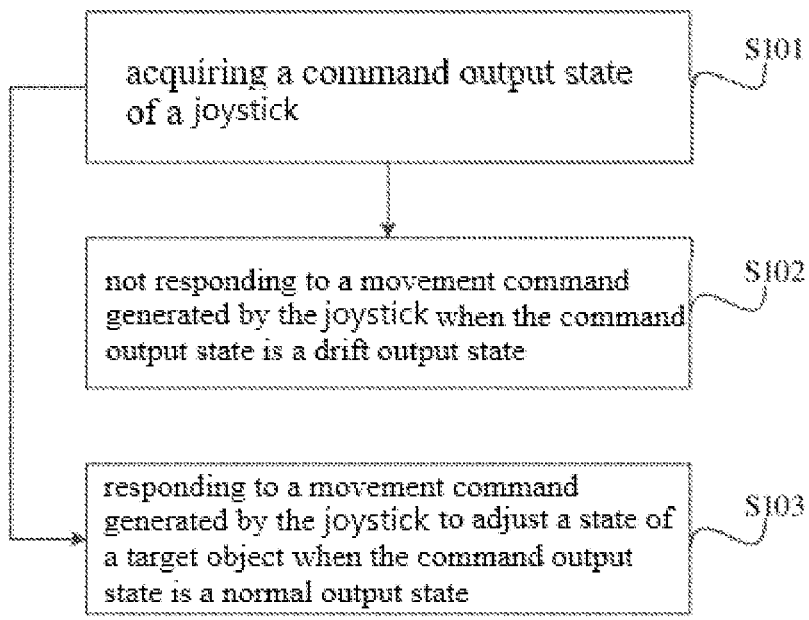
FIG. 1 is a flowchart of a joystick drift processing method according to the present disclosure.

Please refer to FIG. 1, which is the flow chart of steps of a joystick drift processing method according to the present disclosure. The joystick drift method comprises:

S101: acquiring a command output state of a joystick;

S102: not responding to a movement command generated by the joystick when the command output state is a drift output state; and S103: responding to a movement command generated by the joystick to adjust a state of a target object when the command output state is a normal output state.

It can be understood that in the state of user's operation and/or the state of joystick drift, there will be a deviation between the actual position and the initial position (which may be a vertical position or a reset position) of the joystick. In other words, in the above two states, the joystick will generate a corresponding movement command according to its current position parameter, so that the processor can subsequently adjust the state of the target object according to the obtained movement command. In order to avoid the misoperation on the target object in the joystick drift state, this embodiment first judges the command output state of the joystick to distinguish whether the movement command generated by the joystick is based on user's operation or based on joystick drift.

Specifically, in this embodiment, in the drift output state, the movement command generated by the joystick is based on the joystick drift, while in the normal output state, the movement command generated by the joystick is based on the user's operation. When it is determined that the command output state of the joystick is the normal output state, the processor adjusts the state of the target object according to the obtained movement command. When it is determined that the command output state of the joystick is the drift output state, the processor does not process the obtained movement command, namely, the processor does not adjust the state of the target object at this moment, so that the target object remains in the original state, thereby avoiding the misoperation on the target object and thus improving the game experience of users.

Thus, in this embodiment, the command output state of the joystick is obtained first. Based on the command output state of the joystick, it can be distinguished whether the movement command generated by the joystick is based on user's operation or based on joystick drift. When the joystick is in the normal output state, namely, the movement command generated by the joystick is based on user's operation, the processor in the handle responds to the movement command generated by the joystick to adjust the state of the target object. When the joystick is in the drift output state, the processor does not respond to the movement commands generated by the joystick, thereby avoiding the misoperation on the target object and improving the game experience of users.

On the basis of the above embodiment, as a preferred embodiment, the process of acquiring the command output state of the joystick is specifically: acquiring the command output state of the joystick via a detection device that is disposed on an operating lever of the joystick.

Specifically, considering that the user generally changes the position of the joystick by operating the operating lever of the joystick, based on this, in this embodiment, a detection device is provided on the operating lever of the joystick to ensure the movement consistency of the detection device and the joystick, thereby improving the accuracy of the acquired command output state of the joystick.

Specifically, when the user operates the operating lever, the detection device will be touched at the same time. When the detection device detects that its own position has changed, it will generate corresponding execution commands to indicate that the user has operated the operating lever. It can be understood that the joystick drift is caused by foreign matters such as dust and sweat entering the joystick or by the failure of the reset device of the joystick due to long-term use; thus, when the joystick outputs the movement command due to the joystick drift, the position of the detection device itself will not change, and at this moment, the detection signal of the detection device will not change or the change value of the detection signal will be less than a preset threshold. To sum up, whether the detection signal of the detection device changes or the change value of the detection signal exceeds a preset threshold within a certain time may be used as a basis for distinguishing whether the movement command generated by the joystick is based on operating the joystick by the user or based on the joystick drift. Specifically, if the processor obtains the movement command generated by the joystick, but does not obtain that the detection signal of the detection device changes or the change value of the detection signal does not exceed the preset threshold, it is determined that the command output state of the joystick is the drift output state, and at this moment, the processor does not process the movement command generated by the joystick; otherwise, it is determined that the command output state of the joystick is the normal output state.

Specifically, the processor may detect whether the detection signal of the detection device changes or the change value of the detection signal exceeds the preset threshold according to a second preset acquisition cycle, and determines whether to respond to the movement command according to whether a changed detection signal is obtained or the change value of the detection signal exceeds the preset threshold. The second preset acquisition cycle and the first preset acquisition cycle may be set to be the same, so that the processor can synchronously receive the movement command and the changed detection signal or the change value of the detection signal exceeding the preset threshold, so as to improve the data processing speed, thereby improving the response speed of the processor to the movement command, and further enhancing the user's game experience.

As a preferred embodiment, the process of acquiring the command output state of the joystick specifically comprises:
  acquiring a movement parameter of the joystick corresponding to a current acquisition cycle; and
  comparing the movement parameter with a target parameter, and determining that the command output state is the drift output state or the normal output state according to a comparison result.

It can be understood that the detection device is disposed on the operating lever of the joystick, and the position of the detection device itself corresponds to the position of the joystick. In order to better distinguish the command output state of the joystick, the movement parameter of the joystick can be acquired by the detection device. Based on the above discussion, it can be seen that under the state of user's operation and/or the state of joystick drift, the joystick will generate a corresponding movement command according to its current position parameter. The movement parameter in this embodiment is used to judge whether the position of the joystick has changed. If it has changed, it means that the user has operated the operating lever. If it has not changed, it means that the user has not operated the operating lever, and the joystick generated the movement command based on the joystick drift. Here, the movement parameter here is the detection signal of the detection device mentioned above.

As a preferred embodiment, the movement parameter of the joystick may be specifically its position parameter. The position parameter corresponding to the current acquisition cycle may be reflected by the current coordinates $(x_i, y_i)$. Correspondingly, the target parameter may be the coordinates $(x_{i-1}, y_{i-1})$ obtained in the previous acquisition cycle. The current coordinates $(x_i, y_i)$ are compared with the coordinates $(x_{i-1}, y_{i-1})$ obtained in the previous acquisition cycle. If the two are the same, it indicates that the position of the joystick has not changed in the current acquisition cycle. Further, considering the case that the user need to keep the virtual character in a certain state and control the joystick to maintain a certain position for a long time, in order to avoid misjudgment of the command output state of the joystick, the coordinates $(x_1, y_1)$ of the joystick obtained in the first acquisition cycle and the coordinates $(x_{i-1}, y_{i-1})$ of the joystick obtained in the previous acquisition cycle after the handle is started may be both taken as the target parameters for subsequent comparison operations. If the current coordinates $(x_i, y_i)$ of the joystick are different from the coordinates $(x_1, y_1)$ of the joystick obtained in the first acquisition cycle and/or the coordinates $(x_{i-1}, y_{i-1})$ of the joystick obtained in the previous acquisition cycle, it means that the position of the joystick has changed in the current acquisition cycle, and the joystick generated the movement command based on the user's operation. At this point, the detection device outputs a corresponding execution command. When the processor receives the execution command, it determines that the command output state of the joystick is the normal output state, and executes the operation corresponding to the normal output state. If the current coordinates $(x_i, y_i)$ of the joystick are the same as the coordinates $(x_1, y_1)$ of the joystick obtained in the first acquisition cycle and the coordinates $(x_{i-1}, y_{i-1})$ of the joystick obtained in the previous acquisition cycle, it means that the position of the joystick has not changed in the current acquisition cycle. At this point, the joystick outputs the movement command based on the joystick drift, that is, the command output state of the joystick is the drift output state, the detection signal of the detection device has not changed, and the processor does not respond to the movement command generated by the joystick. In this embodiment, the detection device includes but is not limited to IMU, and acquires the position parameter of the joystick through IMU.

As another preferred embodiment, the movement parameter of the joystick may also include a pressure parameter. It may be understood that when the user operates the operating lever, it is equivalent to applying a certain force on the operating lever to move the operating lever to a corresponding position. Therefore, whether the user has operated the operating lever can be judged according to the pressure applied on the operating lever. The target parameter may be the minimum pressure value applied on the operating lever when the user operates the operating lever. The current pressure value of the joystick is compared with the target parameter. If the difference between the current pressure value and the target parameter is less than a preset threshold, it is determined that the user has not operated the joystick. At this point, the joystick outputs the movement command based on the joystick drift, that is, the command output state of the joystick is the drift output state, and the processor performs the operation corresponding to the drift output state. If the difference between the current pressure value and the target parameter exceeds the preset threshold, it is determined that the user has operated the joystick. The joystick generated the movement command based on the user's operation of the joystick. At this point, the processor determines that the command output state of the joystick is the normal output state and executes the operation corresponding to the normal output state. Correspondingly, the detection device may also comprise a pressure sensor for detecting the pressure parameter of the operating lever.

Besides IMU and/or pressure sensor, the detection device may also be other detection elements that can implement this solution, such as a position sensor, which is not particularly limited in the present disclosure.

As a preferred embodiment, the joystick drift processing method further comprises:
providing prompt information corresponding to the drift output state when the command output state is the drift output state.

Further, when the processor determines that the command output state of the joystick is the drift output state, it generates corresponding prompt information, and sends the prompt information to the prompt device for prompt, so that the user can take corresponding measures according to the prompt information. The prompt information may include but not limited to the calibration prompt information, so that the user can send a calibration command according to the calibration prompt information, and perform a corresponding calibration operation to calibrate the initial position of the joystick and ensure the subsequent accurate control of the target object. The prompt information may also be vibration or prompt sound to prompt the user that the command output state of the joystick is the drift output state. The user may send a calibration command by pressing a key, voice, touch, etc. Of course, the specific contents of the prompt information and calibration command may be set according to actual needs, which are not particularly limited in the present disclosure.

As a preferred embodiment, the joystick drift processing method further comprises: judging whether the command output state of the joystick is the drift output state when receiving a calibration command; and if yes, calibrating the joystick in response to the calibration command.

Specifically, the user may operate the calibration device to output the calibration command after obtaining the above calibration prompt information, or operate the calibration device to output the calibration command at any time, so that when the processor receives the calibration command, it can further determine whether the command output state of the joystick is the drift output state. When the command output state is the drift output state, it calibrates the initial position parameter of the joystick. The calibration device may comprise a calibration key on the handle. The calibration key may be an independent key, or a combination of existing keys, such as a home key plus an X key. The user may generate a calibration command by operating the calibration key to make the handle enter the calibration mode. The calibration key may also be a screen, microphone, etc. The user may output the calibration command by touching the screen, sending a voice command, etc.

In order to improve the accuracy of acquiring the current position parameter of the joystick, the user need to place the handle on a horizontal desktop for a preset period of time after operating the calibration device to output the calibration command and make the handle enter the calibration mode, so as to avoid the influence of external environmental factors such as gravity and pressure on the judgment of the joystick position. In the calibration mode, the handle returns to the initial state after startup to avoid the change of the position of the joystick due to other operational commands. The detection device will obtain multiple groups of position parameters of the joystick within the preset time period. The position parameters may specifically be position coordinates. Multiple groups of position coordinates are compared. If the change value among the multiple groups of position coordinates exceeds a certain threshold, it indicates that the calibration condition is not met. At this point, relevant information will be prompted to remind the user to adjust, so as to ensure the reliability of the calibration results. If the coordinates of multiple groups of position parameters are the same, or the change value among the multiple groups of position parameters does not exceed a certain threshold, and the difference between the position parameters and the initial position parameters is greater than a preset threshold, it is determined that the calibration condition is met, and the command output state of the joystick is the drift output state.

It can be understood that the processor adjusts the state of the target object according to the deviation between the current position parameter and the initial position parameter of the joystick. According to this embodiment, the initial position parameter is the origin position of the joystick reset when there is no error. In this embodiment, after responding to the calibration command, the joystick is calibrated to the initial position, or the calibrated position parameter is taken as the new initial position parameter, to correct the position deviation caused by the drift of the joystick, thereby accurately adjusting the state of the target object and further improving the user's game experience.

Figure 2:
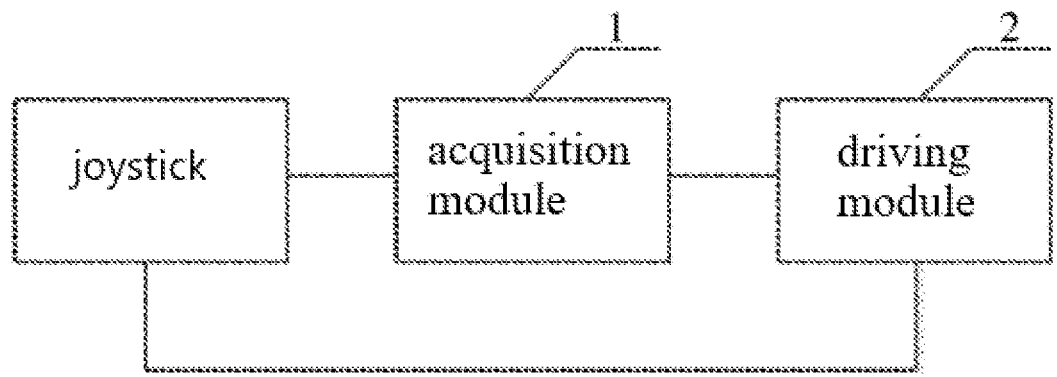
FIG. 2 is a schematic view of the structure of a joystick drift processing device according to the present disclosure.

Please refer to FIG. 2, which is a schematic view of the structure of a joystick drift processing device according to the present disclosure. The joystick drift processing device comprises:
an acquisition module 1 for acquiring a command output state of the joystick; and
a driving module 2 for, not responding to a movement command generated by the joystick when the command output state is a drift output state, and responding to a movement command generated by the joystick to adjust a state of a target object when the command output state is a normal output state.

As a preferred embodiment, the acquisition module 1 specifically comprises:
an acquisition unit for acquiring a moving parameter of the joystick corresponding to a current acquisition cycle; and a determination unit for comparing the moving parameter with a target parameter, and determining that the command output state is the drift output state or the normal output state according to a comparison result.

As a preferred embodiment, the acquisition module 1 is specifically for acquiring the command output state of the joystick via a detection device that is disposed on an operating lever of the joystick.

As a preferred embodiment, the movement parameter includes a position parameter and/or a pressure parameter.

As a preferred embodiment, the joystick drift processing device further comprises:

a prompt module for providing prompt information corresponding to the drift output state when the command output state is the drift output state.

As a preferred embodiment, a process of responding to the movement command generated by the joystick to adjust the state of the target object specifically comprises:

obtaining a current position parameter of the joystick by means of the movement command; and adjusting the state of the target object according to the current position parameter and an initial position parameter.

As a preferred embodiment, the joystick drift processing device further comprises:

a calibration module for judging whether the command output state of the joystick is the drift output state when receiving a calibration command, and if yes, calibrating the joystick in response to the calibration command.

As a preferred embodiment, a process of judging whether the command output state of the joystick is the drift output state specifically comprises:

acquiring a plurality of position parameters of the joystick within a preset time period;

when the plurality of position parameters are the same, and a difference between the position parameters and initial position parameters is greater than a preset threshold, determining that the state of the joystick is the drift state.

On the other hand, the present disclosure also provides a handle, comprising:

a handle body on which a joystick is provided;

a memory for storing a computer program; and a processor for realizing steps of the joystick drift processing method described in any one of the above embodiments when executing the computer program.

For the introduction of the handle according to the present disclosure, please refer to the above embodiments, and will not be repeated here.

The handle according to the present disclosure has the same beneficial effect as the joystick drift processing method.

On the other hand, the present disclosure also provides a computer-readable storage medium on which a computer program is stored. When the computer program is executed by a processor, the steps of the joystick drift processing method described in any one of the above embodiments are realized.

For the introduction of the computer-readable storage medium according to the present disclosure, please refer to the above embodiments, and will not be repeated here.

The computer-readable storage medium according to the present disclosure has the same beneficial effect as the joystick drift processing method.

It should also be noted that, relational terms such as first and second used herein are only to distinguish one entity or operation from another, and do not necessarily require or imply that there is such actual relationship or order among those entities or operations. Moreover, the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

The above description of the disclosed embodiments enables those skilled in the art to realize or use the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments shown herein, but will conform to the widest scope consistent with the principles and novel features disclosed herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A joystick drift processing method, comprising:
acquiring a command output state of a joystick;
not responding to a movement command generated by the joystick and providing prompt information corresponding to the drift output state when the command output state is a drift output state; and
responding to a movement command generated by the joystick to adjust a state of a target object when the command output state is a normal output state.

2. The joystick drift processing method according to claim 1, wherein a process of acquiring the command output state of the joystick specifically comprises:
acquiring a movement parameter of the joystick corresponding to a current acquisition cycle; and
comparing the movement parameter with a target parameter, and determining that the command output state is the drift output state or the normal output state according to a comparison result.

3. The joystick drift processing method according to claim 2, wherein the movement parameter includes a position parameter and/or a pressure parameter.

4. The joystick drift processing method according to claim 3, further comprising:
judging whether the command output state of the joystick is the drift output state when receiving a calibration command; and
if yes, calibrating the joystick in response to the calibration command.

5. The joystick drift processing method according to claim 2, further comprising:

judging whether the command output state of the joystick is the drift output state when receiving a calibration command; and if yes, calibrating the joystick in response to the calibration command.

6. The joystick drift processing method according to claim 1, wherein a process of acquiring the command output state of the joystick is specifically:

acquiring the command output state of the joystick via a detection device that is disposed on an operating lever of the joystick.

7. The joystick drift processing method according to claim 6, further comprising:

judging whether the command output state of the joystick is the drift output state when receiving a calibration command; and if yes, calibrating the joystick in response to the calibration command.

8. The joystick drift processing method according to claim 1, wherein a process of responding to the movement command generated by the joystick to adjust the state of the target object specifically comprises:

obtaining a current position parameter of the joystick by means of the movement command; and adjusting the state of the target object according to the current position parameter and an initial position parameter.

9. The joystick drift processing method according to claim 8, further comprising:

judging whether the command output state of the joystick is the drift output state when receiving a calibration command; and if yes, calibrating the joystick in response to the calibration command.

10. The joystick drift processing method according to claim 1, further comprising:

judging whether the command output state of the joystick is the drift output state when receiving a calibration command; and if yes, calibrating the joystick in response to the calibration command.

11. The joystick drift processing method according to claim 10, wherein a process of judging whether the command output state of the joystick is the drift output state specifically comprises:

acquiring a plurality of position parameters of the joystick within a preset time period;

when the plurality of position parameters are same, and a difference between the position parameters and initial position parameters is greater than a preset threshold, determining that the state of the joystick is the drift state.

12. A joystick drift processing device, comprising:

an acquisition module configured for acquiring a command output state of the joystick; and a driving module configured for, not responding to a movement command generated by the joystick and providing prompt information corresponding to the drift output state when the command output state is a drift output state, and responding to a movement command generated by the joystick to adjust a state of a target object when the command output state is a normal output state.

* * * * *